United States Patent
Chae (10) Patent No.: US 8,791,988 B2
(45) Date of Patent: Jul. 29, 2014

(54) IMAGE DISPLAY DEVICE (75) Inventor: Heeyoung Chae, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 522 days.

(21) Appl. No.: 13/172,056

(22) Filed: Jun. 29, 2011

(65) Prior Publication Data
US 2012/0013610 A1  Jan. 19, 2012

(30) Foreign Application Priority Data
Jul. 14, 2010 (KR) .................. 10-2010-0068133

(51) Int. Cl.
H04N 13/04   (2006.01)
H04N 9/47   (2006.01)
G02B 27/22   (2006.01)

(52) U.S. Cl.
CPC ....... *H04N 13/0497* (2013.01); *H04N 13/0404* (2013.01); *G02B 27/22* (2013.01)
USPC ............... 348/51; 348/43; 345/419; 345/211; 359/465

(58) Field of Classification Search
USPC .................................. 348/41–161
See application file for complete search history.

(56) References Cited

U.S. PATENT DOCUMENTS

| 7,513,623 | B2 * | 4/2009 | Thomas ............................ 353/7 |
| 7,986,283 | B2 * | 7/2011 | Park et al. ....................... 345/32 |
| 8,531,764 | B2 * | 9/2013 | Park ............................... 359/465 |
| 8,605,135 | B1 * | 12/2013 | Sethna et al. ................... 348/51 |
| 2007/0146358 | A1 * | 6/2007 | Ijzerman ...................... 345/419 |
| 2008/0169997 | A1 * | 7/2008 | Choi ................................ 345/6 |
| 2008/0204546 | A1 * | 8/2008 | Dawe et al. ..................... 348/51 |
| 2008/0285282 | A1 * | 11/2008 | Karman et al. ................ 362/252 |
| 2010/0194857 | A1 * | 8/2010 | Mentz et al. .................... 348/43 |
| 2010/0265230 | A1 * | 10/2010 | Kang ............................. 345/211 |
| 2011/0001804 | A1 * | 1/2011 | Urey et al. ..................... 348/51 |
| 2011/0096146 | A1 * | 4/2011 | Hulyalkar et al. .............. 348/43 |

* cited by examiner

Primary Examiner — Joseph Ustaris
Assistant Examiner — Talha Nawaz
(74) Attorney, Agent, or Firm — Morgan, Lewis & Bockius LLP (57) ABSTRACT

An image display device includes a display panel, which includes a plurality of pixels and selectively implements a 2D image and a 3D image, and a patterned retarder for dividing light from the display panel, on which the 3D image is implemented, into first and second polarization components. The display panel includes first to fourth gate lines, which cross a data line and are disposed along a column direction in the order named, first and second pixels which are disposed between the first and second gate lines to be vertically adjacent to each other, third and fourth pixels which are disposed between the third and fourth gate lines to be vertically adjacent to each other, and a black matrix spatially for separating left and right images of the 3D image from each other.

7 Claims, 7 Drawing Sheets

FIG. 1

(RELATED ART)

| | Comparison |
|---|---|
| Related art | 240μm    DBEF : Inclusion<br>3D vertical viewing angle : 26°<br>2D luminance : 450 nit<br>3D luminance : 175 nit |
| Present invention | 116μm    DBEF : Not inclusion<br>3D vertical viewing angle : 26°<br>2D luminance : 477 nit<br>3D luminance : 185 nit |

IMAGE DISPLAY DEVICE

This application claims the benefit of Korean Patent Application No. 10-2010-0068133 filed on Jul. 14, 2010, which is incorporated herein by reference for all purposes as if fully set forth herein.

BACKGROUND OF THE INVENTION

1. Field of the Invention

Embodiments of the invention relate to an image display device capable of implementing a two-dimensional plane image (hereinafter referred to as '2D image') and a three-dimensional stereoscopic image (hereinafter referred to as '3D image').

2. Discussion of the Related Art

An image display device capable of selectively implementing a 2D image and a 3D image has been recently raised due to the development of various video contents. The image display device implements the 3D image using a stereoscopic technique or an autostereoscopic technique.

The stereoscopic technique, which uses a parallax image between left and right eyes of a user with a high stereoscopic effect, includes a glasses type method and a non-glasses type method, both of which have been put to practical use. In the glasses type method, the parallax image between the left and right eyes is displayed on a direct-view display or a projector through a change in a polarization direction of the parallax image or in a time-division manner, and a stereoscopic image is implemented using polarization glasses or liquid crystal shutter glasses. In the non-glasses type method, an optical plate such as a parallax barrier for separating an optical axis of the parallax image between the left and right eyes is generally installed in front of or behind a display screen.

There is an image display device, in which a patterned retarder is disposed on a display panel, as an example of the glasses type image display device. The image display device implements the 3D image using polarization characteristics of the patterned retarder and polarization characteristics of the polarization glasses the user wears. Thus, the image display device has a less crosstalk between left and right mages of the 3D image and a greater luminance than other stereoscopic image implementation methods. As a result, the image quality of the image display device is excellent.

However, because the left image and the right image, which are spatially adjacent to each other, are displayed on the display panel of the image display device using the patterned retarder, a small 3D vertical viewing angle is provided.

As an example for widening the 3D vertical viewing angle, Japanese Laid Open Publication No. 2002-185983 proposed a technology in which black stripes are formed in an area of the patterned retarder corresponding to black matrixes of the display panel. A luminance of a 2D image of an image display device using the technology is much less than a luminance of an exclusive 2D display device capable of implementing only a 2D image because of the black stripes. Further, the image display device using the technology generates moiré because of interaction between the black stripes and the black matrixes.

Figure 1:
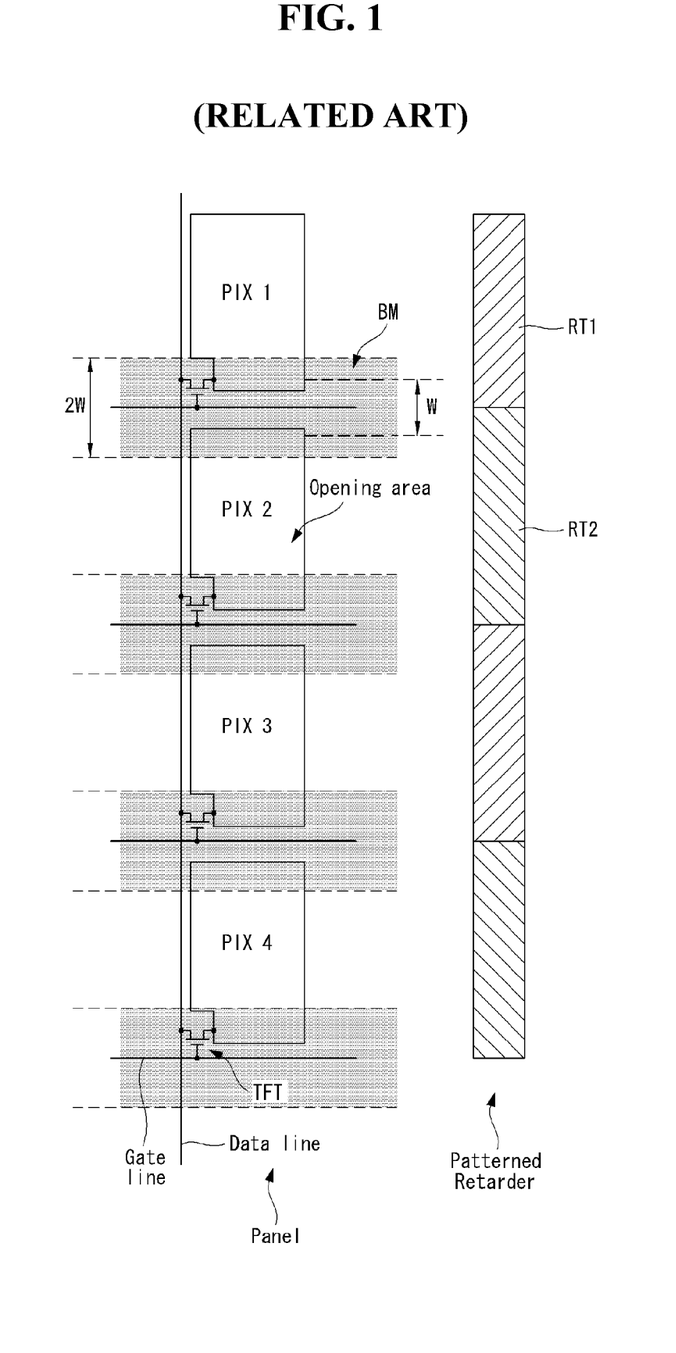
FIG. 1 illustrates a related art image display device.

As another example for widening the 3D vertical viewing angle, as shown in FIG. 1, a technology, in which black matrixes BM of the display panel were manufactured to be wider than black matrixes of the exclusive 2D display device instead of removing the black stripes, was proposed. In the technology, a width 2W of the black matrix BM corresponding to a boundary portion between first and second retarders RT1 and RT2 of a patterned retarder is about two times a width W of the black matrix of the exclusive 2D display device. The black matrixes BM cover gate lines crossing between pixels PIX1 to PIX4, which are vertically adjacent to one another, thin film transistor (TFTs) for applying a pixel signal supplied to a data line to the pixels PIX1 to PIX4, and an upper part and a lower part of each of the pixels PIX1 to PIX4. An opening area of each of the pixels PIX1 to PIX4 is reduced to about 65% of the exclusive 2D display device because of the wider black matrixes BM. As a result, a luminance of a 2D image of an image display device using the technology is much less than the luminance of the exclusive 2D display device.

The related art image display devices using the technologies require light sources, which are more than the number of light sources of the exclusive 2D display device, and a double brightness enhancement film (DBEF), so as to compensate for the luminance of the 2D image. Thus, the manufacturing cost of the image display devices increases. As a result, competition of the image display devices is reduced.

SUMMARY OF THE INVENTION

Embodiments of the invention provide an image display device capable of minimizing a reduction in a luminance of a 2D image and widening a 3D vertical viewing angle without increasing the number of light sources and adding a separate optical film.

In one aspect, there is an image display device comprising a display panel including a plurality of pixels, the display panel being configured to selectively implement a 2D image and a 3D image, and a patterned retarder configured to divide light from the display panel, on which the 3D image is implemented, into a first polarization component and a second polarization component, wherein the display panel includes first to fourth gate lines, which cross a data line and are vertically disposed along a column direction in the order named, first and second pixels which are disposed between the first and second gate lines to be vertically adjacent to each other, are connected to the first and second gate lines, respectively, and commonly display a left image of the 3D image when the 3D image is implemented, third and fourth pixels which are disposed between the third and fourth gate lines to be vertically adjacent to each other, are connected to the third and fourth gate lines, respectively, and commonly display a right image of the 3D image when the 3D image is implemented, and a black matrix configured to spatially separate the left and right images of the 3D image from each other.

A plurality of display lines are formed on the display panel in a line direction perpendicular to the column direction. The first pixel, the second pix.cel, the third pixel, and the fourth pixel are disposed on a first display line, a second display line, a third display line, and a fourth display line, respectively. The black matrix having a predetermined width is disposed on each of a lower part of the second display line and an upper part of the third display line.

The black matrix disposed on the lower part of the second display line and the black matrix disposed on the upper part of the third display line form an integral body.

The predetermined width of the black matrix is determined so that a 3D vertical viewing angle has a previously determined angle capable of preventing interference between the left and right images.

The patterned retarder includes a plurality of first retarders each transmitting the first polarization component and a plurality of second retarders each transmitting the second polarization component, the plurality of first retarders and the plurality of second retarders being alternately disposed. The patterned retarder is aligned so that a boundary portion between the first and second retarders overlaps the black matrix.

A vertical pitch of each of the first and second retarders is about two times a vertical pitch of each of the plurality of pixels.

The image display device further comprises a data driver configured to drive data lines of the display panel. When the 3D image is implemented, the data driver sequentially supplies a data voltage of the left image, the data voltage of the left image, the data voltage of the right image, and the data voltage of the right image, each of which is synchronized with a gate pulse sequentially supplied to the first to fourth gate lines, to the data lines in the order named.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail embodiments of the invention examples of which are illustrated in the accompanying drawings.

Figure 2:
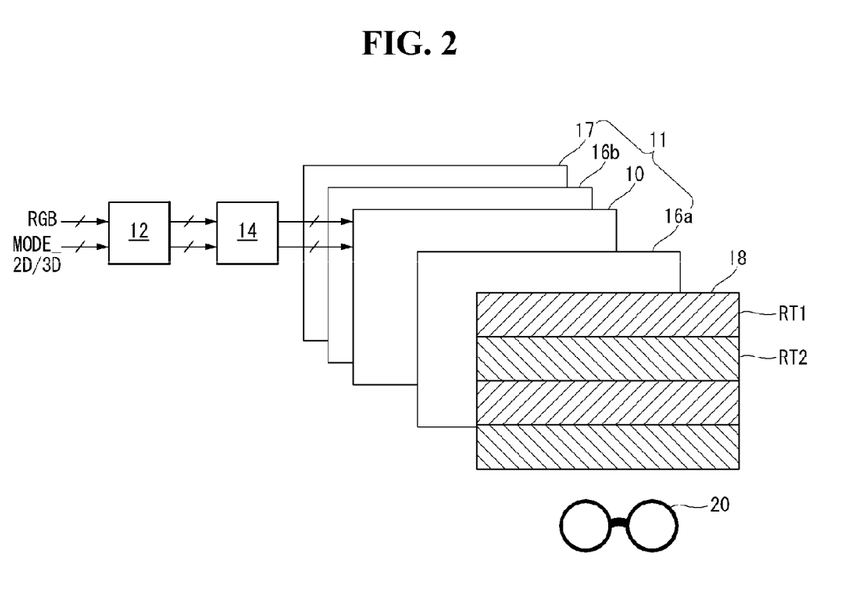
FIG. 2 illustrates an image display device according to an example embodiment of the invention.

FIG. 2 illustrates an image display device according to an example embodiment of the invention.

As shown in FIG. 2, an image display device according to an example embodiment of the invention includes a display element 11, a controller 12, a panel driver 14, a patterned retarder 18, and polarization glasses 20.

The display element 11 may be implemented as a flat panel display such as a liquid crystal display (LCD), a field emission display (FED), a plasma display panel (PDP), and an electroluminescence device (EL) including an inorganic electroluminescence element and an organic light emitting diode (OLED) element. In the following description, the case where the display element 11 is implemented as the liquid crystal display will be taken as an example for the sake of brevity. The patterned retarder 18 and the polarization glasses 20 serve as a 3D driving element and thus spatially separate a left image and a right image from each other, thereby implementing a binocular disparity.

A display panel 10 of the display element 11 includes an upper glass substrate, a lower glass substrate, and a liquid crystal layer between the upper and lower glass substrates. The display panel 10 includes liquid crystal cells, which are arranged in a matrix form based on a crossing structure of data lines and gate lines. A pixel array including the data lines, the gate lines, thin film transistors (TFTs), pixel electrodes, and storage capacitors is formed on the lower glass substrate of the display panel 10. The liquid crystal cells are driven by an electric field between the pixel electrodes connected to the TFTs and common electrodes. Black matrixes, color filters, and the common electrodes are formed on the upper glass substrate of the display panel 10. An upper polarizing film 16a is attached to the upper glass substrate of the display panel 10, and a lower polarizing film 16b is attached to the lower glass substrate of the display panel 10. Alignment layers for setting a pre-tilt angle of liquid crystals are respectively formed on the upper and lower glass substrates of the display panel 10.

In a vertical electric field driving manner such as a twisted nematic (TN) mode and a vertical alignment (VA) mode, the common electrodes are formed on the upper glass substrate. In a horizontal electric field driving manner such as an in-plane switching (IPS) mode and a fringe field switching (FFS) mode, the common electrodes are formed on the lower glass substrate along with the pixel electrodes. A column spacer may be formed between the upper and lower glass substrates to keep cell gaps of the liquid crystal cells constant.

The display panel 10 may be implemented in any liquid crystal mode as well as the TN, VA, IPS, and FFS modes. The liquid crystal display according to the embodiment of the invention may be implemented as any type liquid crystal display including a backlit liquid crystal display, a transflective liquid crystal display, and a reflective liquid crystal display. A backlight unit 17 is necessary in the backlit liquid crystal display and the transflective liquid crystal display. The backlight unit 17 may be implemented as a direct type backlight unit or an edge type backlight unit.

The patterned retarder 18 is attached to the upper polarizing film 16a of the display panel 10. A plurality of first retarders RT1 are formed on odd-numbered lines of the patterned retarder 18, and a plurality of second retarders RT2 are formed on even-numbered lines of the patterned retarder 18. Light absorption axes of the first retarders RT1 are perpendicular to light absorption axes of the second retarders RT2. The first retarder RT1 transmits a first polarization (for example, circular polarization or linear polarization) component of light incident from the pixel array. The second retarder RT2 transmits a second polarization (for example, circular polarization or linear polarization) component of the light incident from the pixel array. The first retarder RT1 of the patterned retarder 18 may be implemented as a polarization filter transmitting left circularly polarized light, and the second retarder RT2 of the patterned retarder 18 may be implemented as a polarization filter transmitting right circularly polarized light.

The polarization glasses 20 include a left eyeglass having a first polarization filter and a right eyeglass having a second polarization filter. The first polarization filter has the same light absorption axis as the first retarder RT1 of the patterned retarder 18, and the second polarization filter has the same light absorption axis as the second retarder RT2 of the patterned retarder 18. For example, a left circular polarization filter may be selected as the first polarization filter of the polarization glasses 20, and a right circular polarization filter may be selected as the second polarization filter of the polarization glasses 20.

The panel driver 14 includes a data driver for driving the data lines of the display panel 10 and a gate driver for driving the gate lines of the display panel 10.

The data driver includes a plurality of source driver integrated circuits (ICs). Each of the source driver ICs includes a shift register, a latch, a digital-to-analog converter (DAC), an output buffer, and the like. The data driver latches digital video data RGB under the control of the controller 12. The data driver converts the digital video data RGB into an analog positive gamma compensation voltage and an analog negative gamma compensation voltage and inverts a polarity of the data voltage in response to a polarity control signal. The data driver outputs the data voltage synchronized with a gate pulse output from the gate driver to the data lines. The data driver outputs the data voltages of a 2D image, from which a left image and a right image are not separated, to the data lines in a 2D mode MODE_2D. The data driver outputs the data voltage of a left image and the data voltage of a right image to the data lines in a 3D mode MODE_3D. The source driver ICs of the data driver may be mounted on a tape carrier package (TCP) and may be bonded to the lower glass substrate of the display panel 10 through a tape automated bonding (TAB) process.

The gate driver includes a shift register, a multiplexer array, a level shifter, and the like. The gate driver sequentially supplies a gate pulse (or scan pulse) to the gate lines under the control of the controller 12. The gate driver may be mounted on the TCP and may be bonded to the lower glass substrate of the display panel 10 through the TAB process. Alternatively, the gate driver and the pixel array may be simultaneously and directly formed on the lower glass substrate of the display panel 10 through a gate-in-panel (GIP) process.

The controller 12 receives timing signals such as a vertical sync signal, a horizontal sync signal, a data enable, and a dot clock from a system board (not shown) and generates control signals for controlling operation timing of the panel driver 14 using the timing signals.

A gate timing control signal for controlling operation timing of the gate driver includes a gate start pulse GSP, a gate shift clock GSC, a gate output enable GOE, and the like. The gate start pulse GSP is generated at the same time as a start time point of one frame period once during the one frame period. The gate start pulse GSP is then applied to a gate driver IC to generate a first gate pulse and thus generates a first output of the gate driver IC. The gate shift clock GSC is commonly input to the plurality of gate driver ICs and shifts the gate start pulse GSP. The gate output enable GOE controls outputs of the gate driver ICs.

A data timing control signal for controlling operation timing of the data driver includes a source start pulse SSP, a source sampling clock SSC, a polarity control signal POL, a source output enable SOE, and the like. The source start pulse SSP controls a data sampling start timing of the data driver. The source sampling clock SSC controls a sampling timing of data inside the data driver based on a rising or falling edge thereof. The polarity control signal POL controls a polarity of the data voltage output from the data driver. The source output enable SOE controls an output timing of the data driver.

The controller 12 receives a mode signal MODE from the system board and may decide the 2D mode MODE_2D or the 3D mode MODE_3D in response to the mode signal MODE. A user may select the 2D mode MODE_2D and the 3D mode MODE_3D using a user interface. Examples of the user interface include a touch screen that is attached on the display panel 10 or mounted inside the display panel 10, an on-screen display (OSD), a keyboard, a mouse, and a remote controller. The system board switches between an operation of the 2D mode MODE_2D and an operation of the 3D mode MODE_3D in response to user data input through the user interface. The system board may detect a 2D or 3D identification code encoded to data of an input image, for example, a 2D or 3D identification code, that can be coded to an electronic program guide (EPG) or an electronic service guide (ESG) of a digital broadcasting standard, thereby distinguishing the 2D mode MODE_2D and the 3D mode MODE_3D.

In the 2D mode MODE_2D, the controller 12 receives digital video data RGB of a 2D image from the system board. The controller 12 may transfer the digital video data RGB of the 2D image to the data driver at an input frame frequency (unit: Hz) or a frame frequency of (the input frame frequency×N), where N is a positive integer equal to or greater than 2. In the 3D mode MODE_3D, the controller 12 receives digital video data RGB of a 3D image from the system board. The controller 12 may transfer the digital video data RGB of the 3D image to the data driver at the frame frequency of (the input frame frequency×N).

Figure 3:
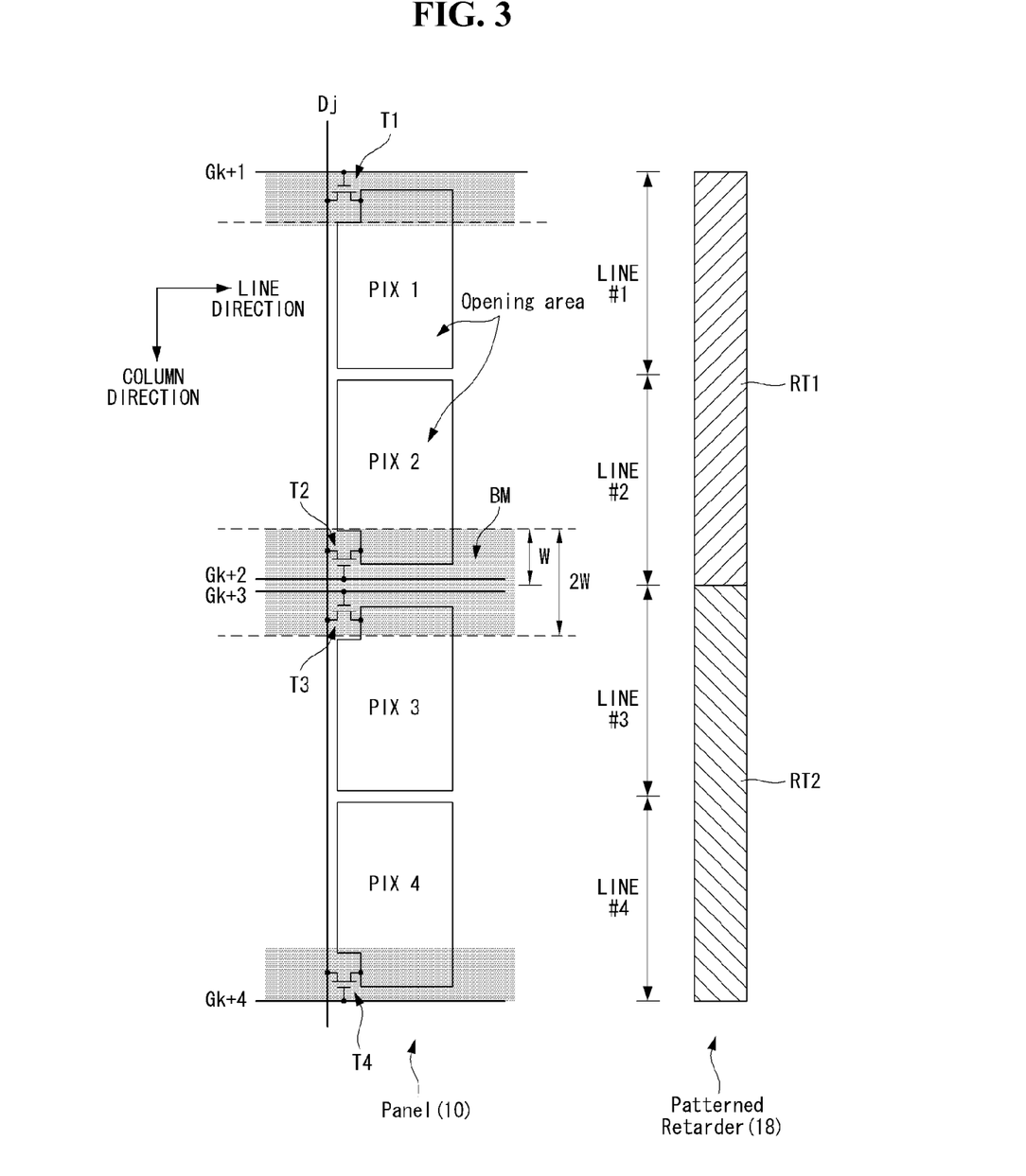
FIG. 3 illustrates a pixel array formed on a display panel and a patterned retarder corresponding to the pixel array.

FIG. 3 illustrates the pixel array formed on the display panel 10 and the patterned retarder corresponding to the pixel array.

As shown in FIG. 3, the pixel array of the display panel 10 includes a data line Dj, first to fourth gate lines Gk+1 to Gk+4, which cross the data line Dj and are vertically disposed along a column direction in the order named, first to fourth pixels PIX1 to PIX4 respectively formed at crossings of the data line Dj and the first to fourth gate lines Gk+1 to Gk+4, and first to fourth TFTs T1 to T4 for respectively applying a pixel signal supplied to the data line Dj to the first to fourth pixels PIX1 to PIX4.

The first and second pixels PIX1 and PIX2 are disposed between the first and second gate lines Gk+1 and Gk+2 to be vertically adjacent to each other.

The first pixel PIX1 is connected to the data line Dj and the first gate line Gk+1 through the first TFT T1. The first TFT T1 includes a gate electrode connected to the first gate line Gk+1, a source electrode connected to the data line Dj, and a drain electrode connected to a pixel electrode of the first pixel PIX1. The first TFT T1 supplies the data voltage from the data line Dj to the pixel electrode of the first pixel PIX1 in response to a gate pulse from the first gate line Gk+1.

The second pixel PIX2 disposed under the first pixel PIX1 is connected to the data line Dj and the second gate line Gk+2 through the second TFT T2. The second TFT T2 includes a gate electrode connected to the second gate line Gk+2, a source electrode connected to the data line Dj, and a drain electrode connected to a pixel electrode of the second pixel PIX2. The second TFT T2 supplies the data voltage from the data line Dj to the pixel electrode of the second pixel PIX2 in response to a gate pulse from the second gate line Gk+2.

The third and fourth pixels PIX3 and PIX4 are disposed between the third and fourth gate lines Gk+3 and Gk+4 to be vertically adjacent to each other.

The third pixel PIX3 is connected to the data line Dj and the third gate line Gk+3 through the third TFT T3. The third TFT T3 includes a gate electrode connected to the third gate line Gk+3, a source electrode connected to the data line Dj, and a drain electrode connected to a pixel electrode of the third pixel PIX3. The third TFT T3 supplies the data voltage from the data line Dj to the pixel electrode of the third pixel PIX3 in response to a gate pulse from the third gate line Gk+3.

The fourth pixel PIX4 disposed under the third pixel PIX3 is connected to the data line Dj and the fourth gate line Gk+4 through the fourth TFT T4. The fourth TFT T4 includes a gate electrode connected to the fourth gate line Gk+4, a source electrode connected to the data line Dj, and a drain electrode connected to a pixel electrode of the fourth pixel PIX4. The fourth TFT T4 supplies the data voltage from the data line Dj to the pixel electrode of the fourth pixel PIX4 in response to a gate pulse from the fourth gate line Gk+4.

A plurality of display lines are formed on the display panel 10 in a line direction perpendicular to the column direction. The first to fourth pixels PIX1 to PIX4 are disposed on first to fourth display lines LINE#1 to LINE#4, respectively.

A black matrix BM having a first width W is disposed on an upper part of each of the first and third display lines LINE#1 and LINE#3, and a black matrix BM having the first width W is disposed on a lower part of each of the second and fourth display lines LINE#2 and LINE#4. The black matrix BM disposed on the lower part of the second display line LINE#2 and the black matrix BM disposed on the upper part of the third display line LINE#3 form an integral body. A width 2W of the integrated black matrix BM is about two times the first width W. The width W of the black matrix BM assigned to each display line is previously determined so that the 3D vertical viewing angle satisfies a previously determined angle. Because the black matrix BM blocks the transmission of light, an opening area of the pixel is defined by the black matrix BM.

The black matrix BM disposed on the upper part of the first display line LINE#1 covers the first gate line Gk+1, the first TFT T1, and the pixel electrode of the first pixel PIX1 by the first width W. The black matrix BM disposed on the lower part of the second display line LINE#2 covers the second gate line Gk+2, the second TFT T2, and the pixel electrode of the second pixel PDC by the first width W. The black matrix BM disposed on the upper part of the third display line LINE#3 covers the third gate line Gk+3, the third TFT T3, and the pixel electrode of the third pixel PIX3 by the first width W. The black matrix BM disposed on the lower part of the fourth display line LINE#4 covers the fourth gate line Gk+4, the fourth TFT T4, and the pixel electrode of the fourth pixel PIX4 by the first width W.

The patterned retarder 18 is aligned on the display panel 10, so that the first retarder RT1 corresponds to the first and second display lines LINE#1 and LINE#2 and the second retarder RT2 corresponds to the third and fourth display lines LINE#3 and LINE#4. A boundary portion between the first and second retarders RT1 and RT2 of the patterned retarder 18 corresponds to a portion between the second and third gate lines Gk+2 and Gk+3. A vertical pitch of each of the first and second retarders RT1 and RT2 may be set to about two times a vertical pitch of each pixel. As the vertical pitch of the patterned retarder 18 increases, there is an advantage of an increase in an alignment margin of the patterned retarder 18 when the patterned retarder 18 is attached to the display panel 10. Hence, the patterned retarder 18 is easily manufactured.

Figure 4:
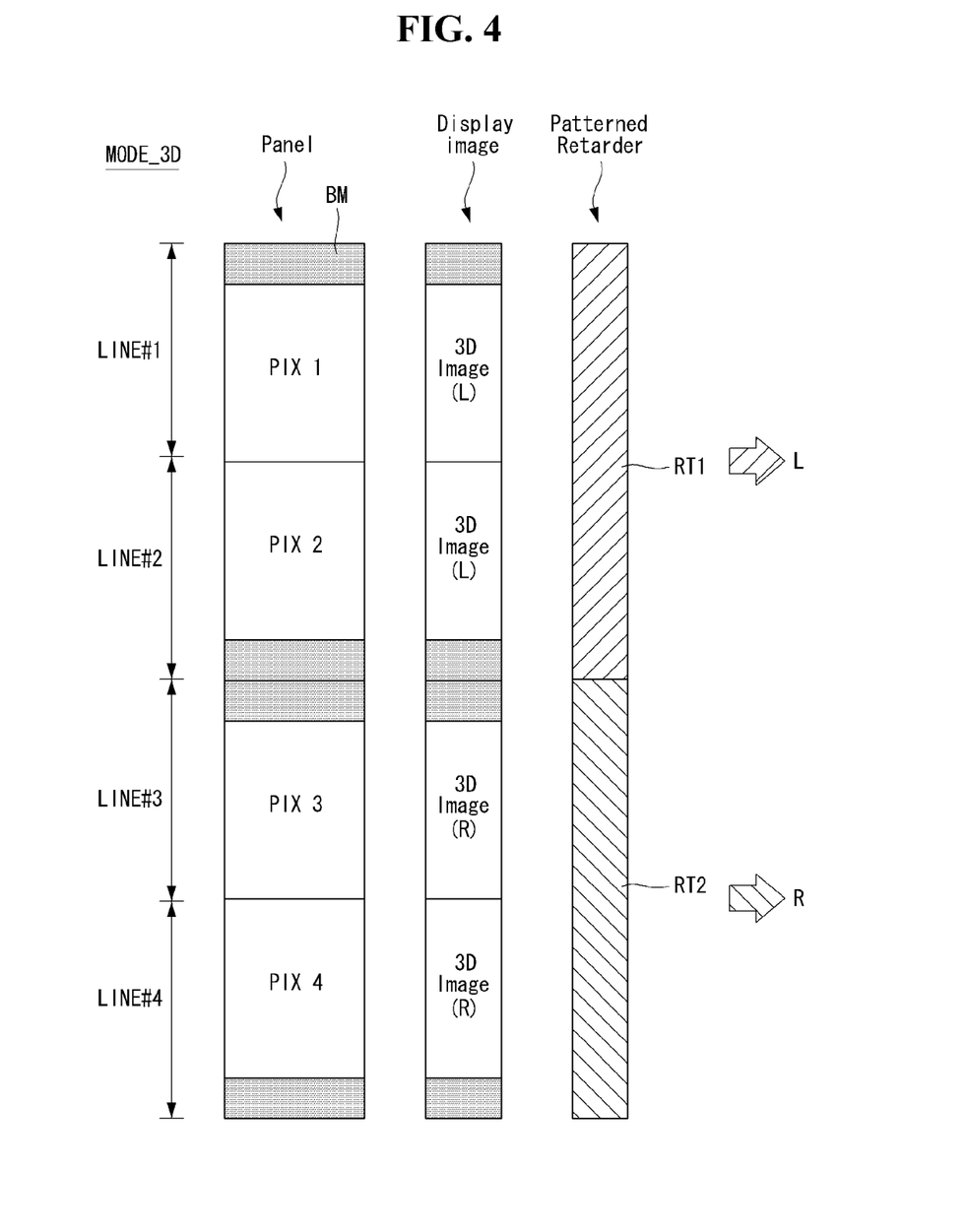
FIG. 4 illustrates an operation of an image display device in a 3D mode.
Figure 5:
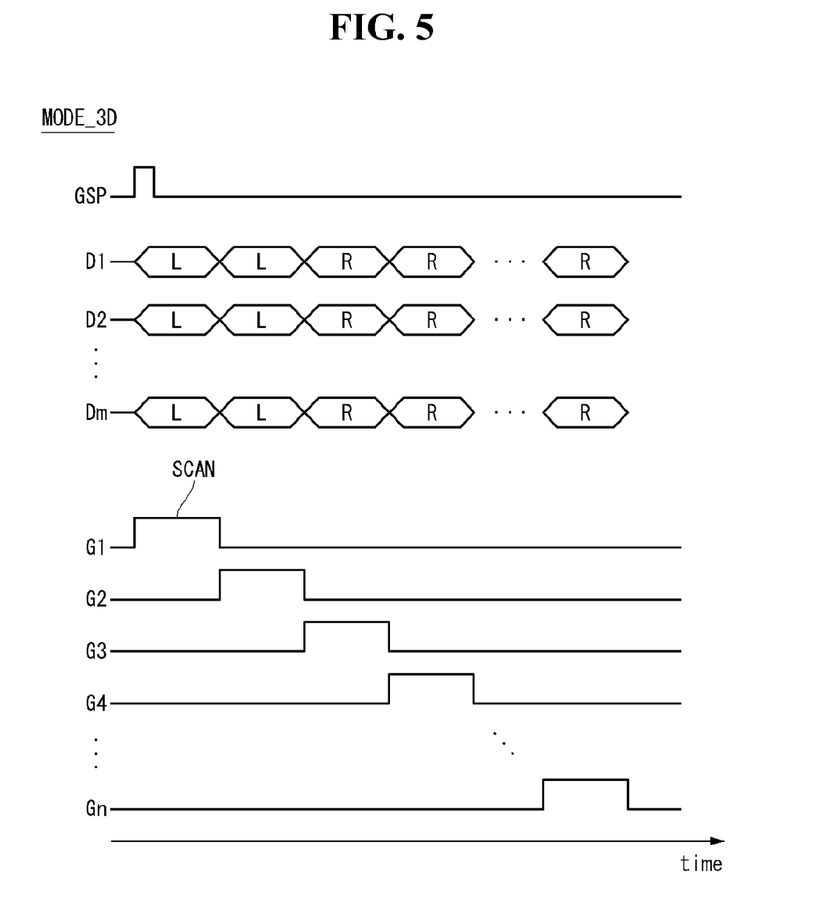
FIG. 5 illustrates 3D image data and a gate pulse input to a display panel in a 3D mode.
Figure 6:
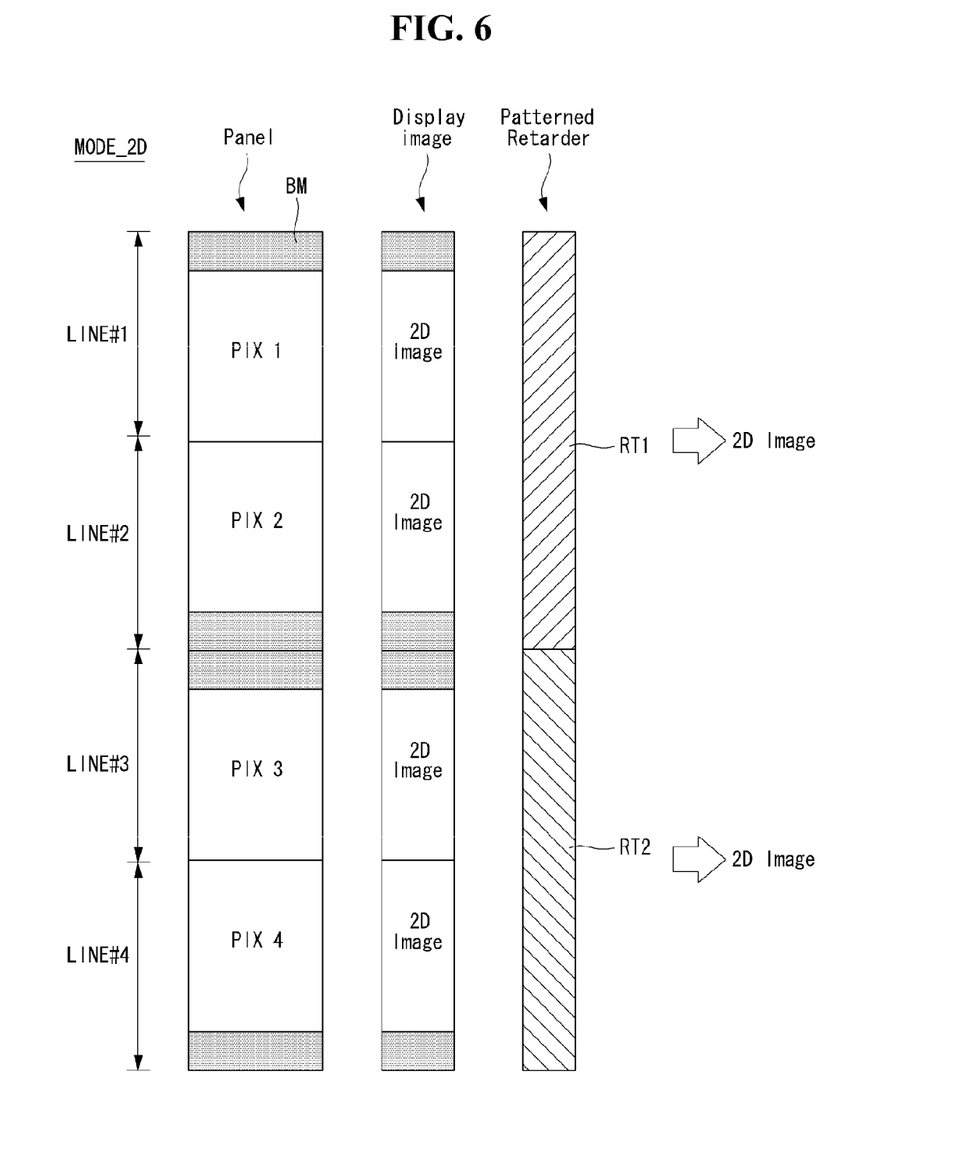
FIG. 6 illustrates an operation of an image display device in a 2D mode.

FIG. 4 illustrates an operation of the image display device in the 3D mode. FIG. 5 illustrates 3D image data and a gate pulse input to the display panel in the 3D mode. FIG. 6 illustrates an operation of the image display device in the 2D mode.

As shown in FIG. 4, in the 3D mode MODE_3D, a left image L of the 3D image is commonly displayed on the first and second pixels PIX1 and PIX2 of the display panel 10, and a right image R of the 3D image is commonly displayed on the third and fourth pixels PIX3 and PIX4 of the display panel 10. For this, as shown in FIG. 5, in the 3D mode MODE_3D, the data driver sequentially supplies the data voltage of the left image L, the data voltage of the left image L, the data voltage of the right image R, and the data voltage of the right image R, which are synchronized with a gate pulse SCAN, to the data lines D1 to Dm in the order named. The left image L displayed on the first and second display lines LINE#1 and LINE#2 transmits the first retarder RT1 of the patterned retarder 18 and then is incident on the left eyeglass of the polarization glasses 20. The right image R displayed on the third and fourth display lines LINE#3 and LINE#4 transmits the second retarder RT2 of the patterned retarder 18 and then is incident on the right eyeglass of the polarization glasses 20. The black matrix BM corresponding to the boundary portion between the first and second retarders RT1 and RT2 provides the large 3D vertical viewing angle, thereby preventing an interference phenomenon between the spatially adjacent left and right images L and R. Because the black matrix BM is formed only in the boundary portion between the second and third display lines LINE#2 and LINE#3 and is not formed between the first and second display lines LINE#1 and LINE#2 and between the third and fourth display lines LINE#3 and LINE#4, the black matrix BM may greatly contribute to an increase in a luminance of the 3D image while providing the large 3D vertical viewing angle.

As shown in FIG. 6, in the 2D mode MODE_2D, the 2D image is displayed on the first to fourth pixels PIX1 to PIX4 of the display panel 10. Because the black matrix BM is formed only in the boundary portion between the second and third display lines LINE#2 and LINE#3 and is not formed between the first and second display lines LINE#1 and LINE#2 and between the third and fourth display lines LINE#3 and LINE#4, the black matrix BM may greatly contribute to an increase in a luminance of the 2D image while providing the large 3D vertical viewing angle.

Figure 7:
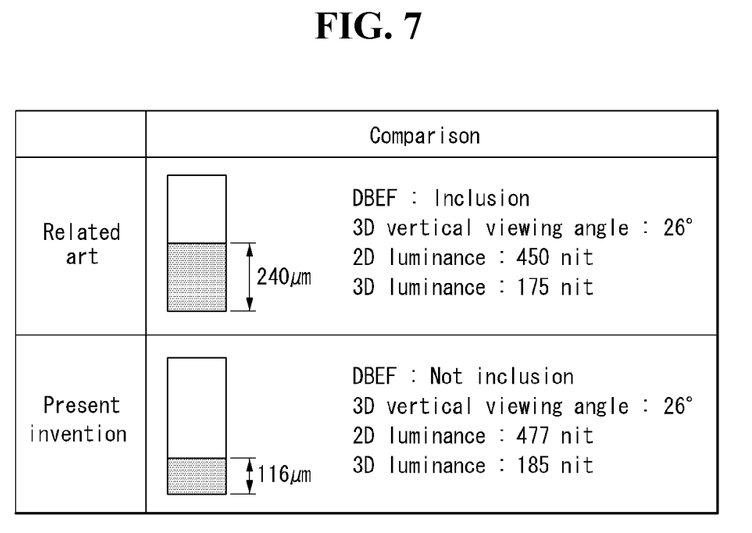
FIG. 7 illustrates a comparison between operation effects of a related art image display device and an image display device according to an example embodiment of the invention.

FIG. 7 illustrates a comparison between operation effects of a related art image display device and the image display device according to the example embodiment of the invention.

As shown in FIG. 7, the related art image display device used a 47-inch display panel having the normal pixel array configuration illustrated in FIG. 1 and had to widely set a width of a black matrix, which was assigned to each display line and disposed at a location corresponding to a boundary portion between first and second retarders, to about 240 µm, so as to provide a 3D vertical viewing angle of about 26°. In an exclusive 2D display device having the 47-inch display panel, a width of a black matrix was generally about 116 µm. As a width of a black matrix in a general image display device increases, an opening area of a pixel decreases. Hence, a display luminance of the general image display device is reduced. Accordingly, the related art image display device unavoidably added a double brightness enhancement film (DBEF), so as to increase a display luminance. The related art image display device increased a luminance of a 2D image to about 450 nit and increased a luminance of a 3D image to about 175 nit using the DBEF.

On the other hand, the image display device according to the example embodiment of the invention may reduces the width of the black matrix assigned to each display line to about 116 µm substantially equal to the width of the exclusive 2D display device and also may provide the 3D vertical viewing angle of about 26° through changes in the configuration of the pixel array. A total width of the black matrix disposed at the location corresponding to the boundary portion between the first and second retarders was about 232 µm. As a result, the display luminance of the image display device according to the example embodiment of the invention may greater than the related art image display device without increasing the number of light sources and adding the DBEF. According to the experiment, the image display device according to the example embodiment of the invention increased a luminance of the 2D image to about 477 nit and increased a luminance of the 3D image to about 185 nit, while providing the 3D vertical viewing angle of about 26°.

As described above, the image display device according to the example embodiment of the invention may minimize a reduction in the luminances of the 2D image and the 3D image and widen the 3D vertical viewing angle through changes in the configuration of the pixel array, changes in the display image, and changes in the vertical pitch of the retarder without increasing the number of light sources and adding a separate optical film.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image display device comprising:
   a display panel including a plurality of pixels, the display panel being configured to selectively implement a 2D image and a 3D image; and
   a patterned retarder configured to divide light from the display panel, on which the 3D image is implemented, into a first polarization component and a second polarization component,
   wherein the display panel includes:
   first to fourth gate lines, which cross a data line and are vertically disposed along a column direction in the order named;
   first and second pixels which are disposed between the first and second gate lines to be vertically adjacent to each other, are connected to the first and second gate lines, respectively, and commonly display a left image of the 3D image when the 3D image is implemented;
   third and fourth pixels which are disposed between the third and fourth gate lines to be vertically adjacent to each other, are connected to the third and fourth gate lines, respectively, and commonly display a right image of the 3D image when the 3D image is implemented; and
   a black matrix configured to spatially separate the left and right images of the 3D image from each other,
   wherein a gate line and the black matrix are not formed between the first and second pixels for commonly displaying the left image of the 3D image, and
   wherein a gate line and the black matrix are not formed between the third and fourth pixels for commonly displaying the right image of the 3D image.

2. The image display device of claim 1, wherein a plurality of display lines are formed on the display panel in a line direction perpendicular to the column direction,
   wherein the first pixel, the second pixel, the third pixel, and the fourth pixel are disposed on a first display line, a second display line, a third display line, and a fourth display line, respectively,
   wherein the black matrix having a predetermined width is disposed on each of a lower part of the second display line and an upper part of the third display line.

3. The image display device of claim 2, wherein the black matrix disposed on the lower part of the second display line and the black matrix disposed on the upper part of the third display line form an integral body.

4. The image display device of claim 2, wherein the predetermined width of the black matrix is determined so that a 3D vertical viewing angle has a previously determined angle capable of preventing interference between the left and right images.

5. The image display device of claim 1, wherein the patterned retarder includes a
   plurality of first retarders each transmitting the first polarization component and a plurality of second retarders each transmitting the second polarization component, the plurality of first retarders and the plurality of second retarders being alternately disposed,
   wherein the patterned retarder is aligned so that a boundary portion between the first and second retarders overlaps the black matrix.

6. The image display device of claim 5, wherein a vertical pitch of each of the first and second retarders is two times a vertical pitch of each of the plurality of pixels.

7. The image display device of claim 1, further comprising a data driver configured to drive data lines of the display panel,
   wherein when the 3D image is implemented, the data driver sequentially supplies a data voltage of the left image, the data voltage of the left image, the data voltage of the right image, and the data voltage of the right image, each of which is synchronized with a gate pulse sequentially supplied to the first to fourth gate lines, to the data lines in the order named.

* * * * *